United States Patent
Xie et al.

(10) Patent No.: US 9,117,130 B2
(45) Date of Patent: Aug. 25, 2015

(54) INFORMATION OBTAINING METHOD AND APPARATUS

(71) Applicant: TENCENT TECHNOLOGY (SHENZHEN) COMPANY LIMITED, Shenzhen (CN)

(72) Inventors: Zhengkai Xie, Shenzhen (CN); Ying Huang, Shenzhen (CN); Sha Mo, Shenzhen (CN); Xi Wang, Shenzhen (CN); Cheng Feng, Shenzhen (CN); Wei Li, Shenzhen (CN); Yulei Liu, Shenzhen (CN); Huijiao Yang, Shenzhen (CN); Bosen He, Shenzhen (CN); Kai Zhang, Shenzhen (CN); Ruiyi Zhou, Shenzhen (CN); Bo Hu, Shenzhen (CN); Tingyong Tang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 58 days.

(21) Appl. No.: 14/106,773

(22) Filed: Dec. 15, 2013

(65) Prior Publication Data

US 2014/0103111 A1    Apr. 17, 2014

Related U.S. Application Data

(63) Continuation of application No. PCT/CN2013/083677, filed on Sep. 17, 2013.

(51) Int. Cl.
| G06K 5/00 | (2006.01) |
| G06K 7/14 | (2006.01) |
| G06K 19/06 | (2006.01) |

(52) U.S. Cl.
CPC ........ *G06K 7/1417* (2013.01); *G06K 19/06037* (2013.01)

(58) Field of Classification Search
CPC . G06K 7/14; G06K 19/06028; G06K 7/1443; G06K 1/12; G06K 7/1456; G06Q 10/10
USPC .......................................... 235/380
See application file for complete search history.

(56) References Cited

U.S. PATENT DOCUMENTS

2001/0023896 A1    9/2001  He et al.

FOREIGN PATENT DOCUMENTS

| CN | 101188014 A | 5/2008 |
| CN | 101398907 A | 4/2009 |
| CN | 102867205 A | 1/2013 |

OTHER PUBLICATIONS

The World Intellectual Property Organization (WIPO) International Search Report for PCT/CN2013/083677 Dec. 19, 2013.

*Primary Examiner* — Thien M Le
*Assistant Examiner* — Tae Kim
(74) *Attorney, Agent, or Firm* — Anova Law Group, PLLC

(57) ABSTRACT

Various embodiments provide methods, apparatus, and electronic devices for information obtaining, information management and 2D barcode generation. In an exemplary method implemented by an electronic device, a first two-dimensional (2D) barcode can be obtained. An image transformation can be performed on the first 2D barcode to obtain a virtual 2D barcode. Further, according to validity of the virtual 2D barcode, relationship information of the first 2D barcode can be obtained based on a mapping relationship of the virtual 2D barcode in a database.

12 Claims, 3 Drawing Sheets

INFORMATION OBTAINING METHOD AND APPARATUS

CROSS-REFERENCES TO RELATED APPLICATIONS

This application is a continuation application of PCT Patent Application No. PCT/CN2013/083677, filed on Sep. 17, 2013, which claims priority to Chinese Patent Application No. 201210348984.3, filed on Sep. 19, 2012, the entire contents of both of which are incorporated herein by reference.

FIELD OF THE DISCLOSURE

The present disclosure generally relates to information processing and, more particularly, relates to information obtaining methods and apparatus for information management and for 2D barcode generation.

BACKGROUND

With the rapid development of the Internet, the Internet of Things has emerged. Identification marking is the first chain in the development of the Internet of Things. By providing tremendous advantages, two-dimensional code, also referred to as 2D barcode, has become a key technology in identification marking 2D barcode is a readable barcode extended from one-dimensional barcode. One example of 2D barcode is Quick Response Code (or QR code).

When a device scans a 2D barcode, by identifying the binary data recorded within the length and width of the barcode, the device can obtain information contained in the barcode. Compared with one-dimensional barcode, 2D barcode has obvious advantages. 2D barcode goes beyond the alphanumeric limitations and can record more complex data with large data capacity. In addition, 2D barcode has relatively small size, and has anti-damage ability. 2D barcode technology has started to be widely applied in fields including object identification, ticket anti-forgery, product promotion, etc. with great advantages.

A 2D barcode records information of data and/or symbols using images of black and white patterns, which are formed by the planar (two-dimensional) distribution of certain geometric shapes according to certain rules. The "0", "1" bit stream concept, which is the basis of computer internal logic, is niftily used in coding. Geometric shapes corresponding to binary codes are used to represent textual and/or numerical information. 2D barcodes can be read automatically by image inputting devices or optoelectronic scanning devices to achieve automatic information processing.

Based on the error-correction function of 2D barcodes, even if a part of (e.g., less than 50% of) the area of a 2D barcode is damaged (e.g., covered or removed), a scanning device may still be able to identify the complete information recorded by the 2D barcode. Currently there are many tools for generating "personalized 2D barcode". That is, some personalized patterns are combined with 2D barcodes to obtain 2D barcodes that are personalized and can be recognized by scanning devices. For example, main elements of a corporate logo or a personal head portrait can be added into a 2D barcode pattern. Personalized 2D barcodes can increase the identifiability of 2D barcodes. 2D barcodes that are visually similar can have different characteristics. In addition, personalized 2D barcodes can also convey business or personal information to a person who receives the information.

Nowadays, 2D barcodes are applied to social business cards, mainly as a method for fast storing electronic business cards. By scanning 2D barcode business cards (i.e., business cards having 2D barcode) using a mobile phone, a person can add friends or open corresponding electronic business cards. However, existing 2D barcode business cards are all characterized as one card corresponding to one user. Relationships between users cannot be obtained through the 2D barcodes.

BRIEF SUMMARY OF THE DISCLOSURE

According to various embodiments, there is provided an information obtaining method. The information obtaining method can be implemented by an electronic device. In an exemplary method, a first two-dimensional (2D) barcode can be obtained. An image transformation can be performed on the first 2D barcode to obtain a virtual 2D barcode. Further, according to validity of the virtual 2D barcode, relationship information of the first 2D barcode can be obtained based on a mapping relationship of the virtual 2D barcode in a database.

According to various embodiments, there is also provided an information obtaining apparatus. The apparatus can include, e.g., a first obtaining unit, an image transformation unit, and an information determination unit. The first obtaining unit can be configured to obtain a first 2D barcode. The image transformation unit can be configured to perform an image transformation on the first 2D barcode to obtain a virtual 2D barcode. The information determination unit can be configured to obtain relationship information of the first 2D barcode according to validity of the virtual 2D barcode. The relationship information can be obtained based on a mapping relationship of the virtual 2D barcode in a database.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the disclosure.

DETAILED DESCRIPTION

Reference will now be made in detail to exemplary embodiments of the disclosure, which are illustrated in the accompanying drawings.

Various embodiments provide information obtaining methods and apparatus for obtaining relationship information of users from 2D barcodes. As used herein, the term "information obtaining" can be used for "information management". As disclosed herein, the "information obtaining method and apparatus" can be used for information management and for 2D barcode generation.

Figure 4:
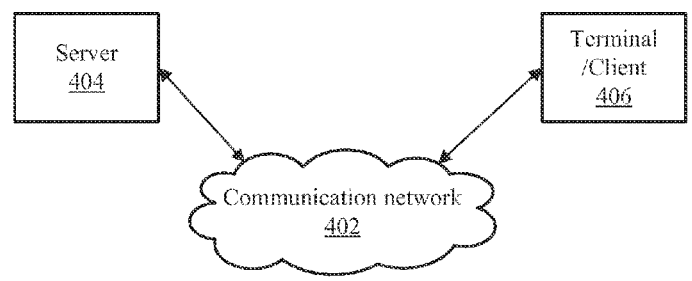
FIG. 4 depicts an exemplary environment incorporating certain disclosed embodiments.

FIG. 4 depicts an exemplary environment 400 incorporating exemplary information obtaining methods and apparatus in accordance with various disclosed embodiments. As shown in FIG. 4, the environment 400 can include a server 404, a terminal 406, and a communication network 402. The server 404 and the terminal 406 may be coupled through the communication network 402 for information exchange, e.g., data processing, database searching, etc. Although only one terminal 406 and one server 404 are shown in the environment 400, any number of terminals 406 or servers 404 may be included, and other devices may also be included.

The communication network 402 may include any appropriate type of communication network for providing network connections to the server 404 and terminal 406 or among multiple servers 404 or terminals 406. For example, the communication network 402 may include the Internet or other types of computer networks or telecommunication networks, either wired or wireless.

A terminal, as used herein, may refer to any appropriate user terminal with certain computing capabilities, e.g., a personal computer (PC), a work station computer, a hand-held computing device (e.g., a tablet), a mobile terminal (e.g., a mobile phone or a smart phone), or any other user-side computing device.

A server, as used herein, may refer to one or more server computers configured to provide certain server functionalities, e.g., database management. A server may also include one or more processors to execute computer programs in parallel.

Figure 5:
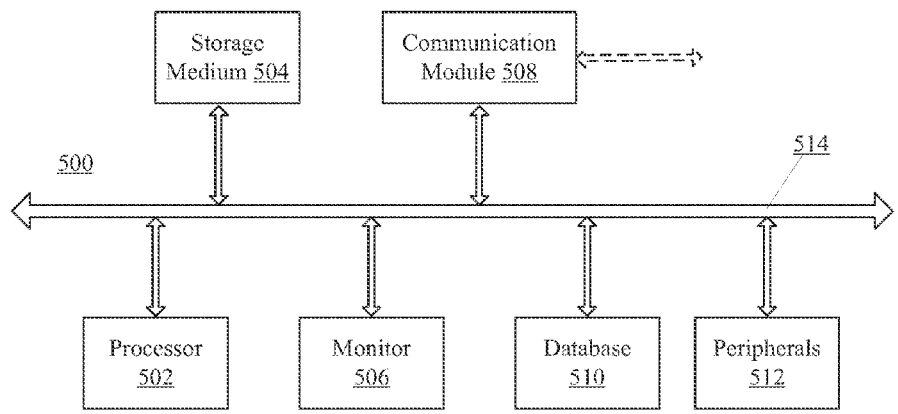
FIG. 5 depicts an exemplary computing system consistent with the disclosed embodiments.

The server 404 and the terminal 406 may be implemented on any appropriate computing platform. FIG. 5 shows a block diagram of an exemplary computing system 500 capable of implementing the server 404 and/or the terminal 406. As shown in FIG. 5, the exemplary computer system 500 may include a processor 502, a storage medium 504, a monitor 506, a communication module 508, a database 510, peripherals 512, and one or more bus 514 to couple the devices together. Certain devices may be omitted and other devices may be included.

The processor 502 can include any appropriate processor or processors. Further, the processor 502 can include multiple cores for multi-thread or parallel processing. The storage medium 504 may include memory modules, such as ROM (Read-Only Memory), RAM (Random Access Memory) and flash memory modules, and mass storages, such as CD-ROM, U-disk, removable hard disk, etc. The storage medium 504 may store computer programs for implementing various processes (e.g., image processing, image transformation, etc.), when executed by the processor 502.

The monitor 506 may include display devices for displaying information outputted by the computing system 500. Further, the peripherals 512 may include I/O devices e.g., keyboard and mouse. The peripherals 512 may also include a scanning device for scanning barcodes such as 2D barcodes. The scanned 2D barcodes can be processed by 2D-barcode recognition software installed within the computing system 500, in order to identify information that the barcodes may contain.

The communication module 508 may include network devices for establishing connections through the communication network 402. The database 510 may include one or more databases for storing certain data and for performing certain operations on the stored data, e.g., storing scanned 2D barcodes, searching the stored 2D barcodes, determining mapping relationship between 2D barcodes, etc. In some embodiments, the database 510 can be within the terminal 406. In other embodiments, the database 510 can be within the server 404 and connected with the terminal 406 through the communication network 402, and the terminal 406 can obtain information outputted by the operations (e.g., database operations) on the server 404.

In operation, the terminal 406 may cause the server 404 to perform certain actions, e.g., database search or other database operations. The server 404 may be configured to provide structures and functions for such actions and operations. More particularly, the server 404 may include a database system for determining mapping relationship between 2D barcodes.

In various embodiments, a terminal involved in the disclosed methods and systems, e.g., a mobile terminal, can include the terminal 406, while a server involved in the disclosed methods and systems can include the server 404. In some embodiments, the disclosed methods and apparatus can be executed by a terminal, such as an electronic device. In other embodiments, the disclosed methods and apparatus can be executed by a terminal (such as an electronic device) and, whenever applicable, the terminal can exchange information/data with a server in order to implement the functions of the disclosed methods and apparatus.

Figure 1:
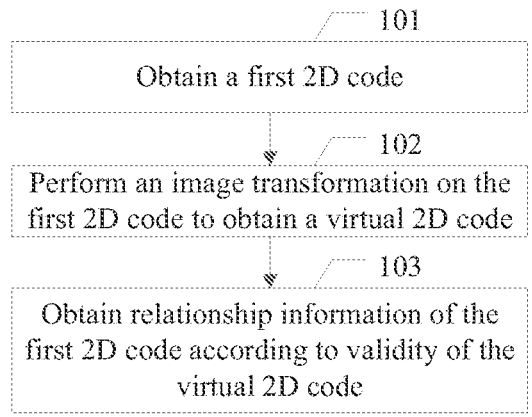
FIG. 1 depicts a flow diagram of an exemplary information obtaining method in accordance with various disclosed embodiments.

FIG. 1 depicts a flow diagram of an exemplary information obtaining method in accordance with various disclosed embodiments. The exemplary information obtaining method can include the following steps.

In Step 101, a first 2D barcode is obtained.

The first 2D barcode can be obtained by an information obtaining apparatus. The information obtaining apparatus can include an electronic device that has functions of 2D barcode scanning and recognition. For example, the information obtaining apparatus can include a mobile terminal loaded with 2D barcode recognition software.

In one example, the first 2D barcode can include a 2D barcode containing personal business card information. In practical applications, through the information obtaining apparatus, a user can obtain the corresponding business card information that the 2D barcode may contain.

In Step 102, an image transformation is performed on the first 2D barcode.

The information obtaining apparatus can perform the image transformation on the first 2D barcode to obtain a virtual 2D barcode. After the information obtaining apparatus obtains the first 2D barcode, the information obtaining apparatus can perform specific image transformation processes on the first 2D barcode. A new 2D barcode image can thus be obtained and can be referred to as a virtual 2D barcode.

The information obtaining apparatus can include a database therein, or can be connected with a database. Mapping relationships corresponding to the virtual 2D barcode can be recorded in the database. A mapping relationship can include, for example, a mapping relationship between the virtual 2D barcode and a second 2D barcode (such as a 2D barcode other than the first 2D barcode), a mapping relationship between the virtual 2D barcode and an address of a network link, a mapping relationship between the virtual 2D barcode and certain definite information (including, e.g., who is the spouse), or a combination thereof. The specific mapping relationship can be determined by the needs of actual applications, and is not limited in the present disclosure.

As disclosed above, in various embodiments, the virtual 2D barcode may include a bunch of information that does not represent any actual meaning Thus, a normal 2D barcode recognition device may possibly be unable to recognize the virtual 2D barcode. The virtual 2D barcode may serve as an intermediate relationship entity that connects two pieces (or types) of information.

In Step 103, according to validity of the virtual 2D barcode, relationship information of the first 2D barcode is obtained.

The information obtaining apparatus can obtain relationship information of the first 2D barcode, according to the validity of the virtual 2D barcode. For example, when the virtual 2D barcode exists in the database, relationship information represented by the virtual 2D barcode can be obtained.

Optionally, the relationship information can include a father-son relationship, a mother-son relationship, a husband-wife relationship, a brother relationship, a sister relationship, a boyfriend-girlfriend relationship, etc. Further, the relationship information can also include a stranger relationship or a friend relationship. Thus, a person that receives the 2D barcode business card can obtain the relationship network information of the business card user (or owner) through the 2D barcode business card.

For example, in practical applications, after a first user generates a 2D barcode as the first user's own business card, the first user can generate a virtual 2D barcode based on a specific image transformation method. The virtual 2D barcode and the first user's relationship information with another person can be set in a database including, for example, a network database on a server. For example, a virtual 2D barcode after a black-white inversion based on the original 2D barcode can represent the first user's spouse information. So the first user can set a mapping relationship in the network database or any suitable database between the virtual 2D barcode and information relevant to the first user's spouse (e.g., the spouse's 2D barcode business card). When another user (i.e., a second user) obtains a 2D barcode business card (from the first user), the second user can perform the same image transformation on an image of the 2D barcode (i.e., the 2D barcode of the first user) to obtain the corresponding virtual 2D barcode. So the second user can obtain the first user's spouse information through the virtual 2D barcode.

According to various disclosed embodiments, image transformation can be performed based on the image information of a first 2D barcode to obtain a virtual 2D barcode. According to the validity of the virtual 2D barcode, relationship information of the first 2D barcode can be obtained. Thus, from a 2D barcode, the relationship information related to the 2D barcode can be obtained. Therefore, the amount of information expressed by a 2D barcode can be improved in a convenient way.

Figure 2:
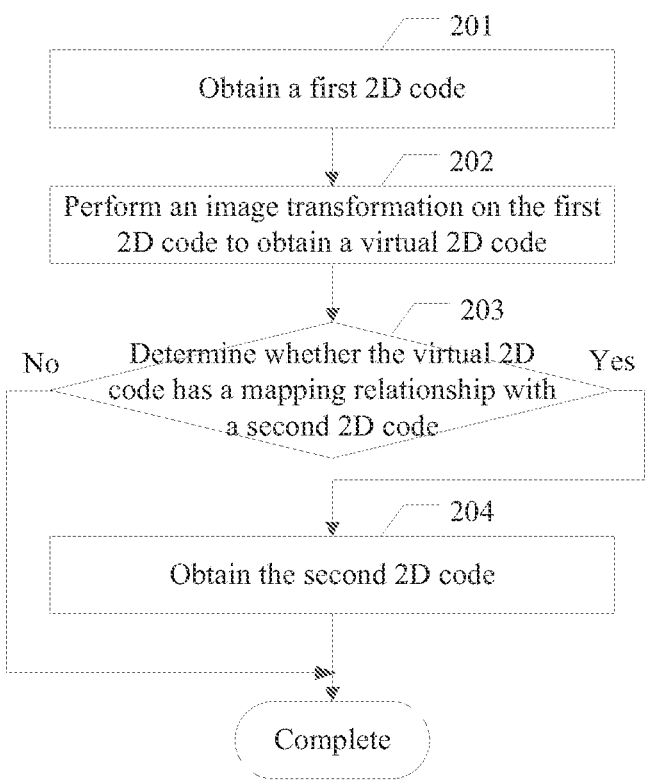
FIG. 2 depicts a flow diagram of another exemplary information obtaining method in accordance with various disclosed embodiments.

FIG. 2 depicts a flow diagram of another exemplary information obtaining method in accordance with various disclosed embodiments. As shown in FIG. 2, another exemplary information obtaining method can include the following steps.

In Step 201, a first 2D barcode is obtained. The Step 201 can be performed similarly to or the same as the above-described step(s) in various disclosed embodiments, e.g., Step 101 as shown in FIG. 1.

In Step 202, an image transformation is performed on the first 2D barcode.

An information obtaining apparatus can perform the image transformation on the first 2D barcode to obtain a virtual 2D barcode. In various disclosed embodiments, the image transformation on the first 2D barcode can include, for example, a black-white inversion on colors of an image of the first 2D barcode, a clockwise rotation of the image of the first 2D barcode by a preset angle, a counter-clockwise rotation of the image of the first 2D barcode by a preset angle, or a combination thereof.

In practical applications, different image transformation methods can correspond to different relationship information. For example, a black-white inversion can correspond to a boyfriend-girlfriend relationship, and a clockwise rotation by a preset angle can correspond to a father-son relationship, and so on. A user can select the corresponding image transformation method according to the relationship information that the user wants to know.

The information obtaining apparatus can include a database therein, or can be connected to a database. Mapping relationships corresponding to the virtual 2D barcode can be recorded in the database. A mapping relationship can include a mapping relationship between the virtual 2D barcode and a second 2D barcode (such as a 2D barcode other than the first 2D barcode), a mapping relationship between the virtual 2D barcode and an address of a network link, a mapping relationship between the virtual 2D barcode and certain definite information (including, for example, who is the spouse), or a combination thereof. The specific mapping relationship can be determined by the needs of actual application, and is not limited in the present disclosure.

As disclosed above, in various embodiments, the virtual 2D barcode may include a bunch of information that does not represent any actual meaning Thus, a normal 2D barcode recognition device may possibly be unable to recognize the virtual 2D barcode. The virtual 2D barcode may serve as an intermediate relationship entity that connects two pieces (or types) of information.

In Step 203, it is determined whether the virtual 2D barcode has a mapping relationship with the second 2D barcode.

The information obtaining apparatus can determine whether the virtual 2D barcode has a mapping relationship with the second 2D barcode. If the virtual 2D barcode has a mapping relationship with a second 2D barcode, the virtual 2D barcode can thus be valid, and it can be determined that the first 2D barcode has relationship information corresponding to the image transformation. If the virtual 2D barcode has no mapping relationship with a second 2D barcode, the virtual 2D barcode can thus be invalid, and it can be determined that the first 2D barcode has no relationship information corresponding to the image transformation.

In Step 204, the second 2D barcode is obtained.

After the virtual 2D barcode is determined to be valid, the second 2D barcode that corresponds to the virtual 2D barcode can be obtained.

For example, in practical applications, the second 2D barcode can be a 2D barcode business card corresponding to a person that has a relationship with the user of a business card having the first 2D barcode. The relationship can include a father-son relationship, a mother-son relationship, a husband-wife relationship, a brother relationship, a sister relationship, a boyfriend-girlfriend relationship, etc. Further, the relationship information can also include a stranger relationship, a friend relationship, etc.

In an exemplary embodiment, when a black-white inversion on colors of an image of the first 2D barcode corresponds to a boyfriend-girlfriend relationship, a 2D barcode itself can encode contents by corresponding "dot" (or "black dot") and "void" (or "white dot") to binary "1" and "0", respectively. Such a 2D barcode can visually appear to be a meaningless pattern formed by black and white dots. The principle of positive and negative shapes can be applied to 2D barcodes. For example, by the color inversion, the negative pattern of the 2D barcode can be obtained. Thus, the patterns of 2D barcodes corresponding to persons in the boyfriend-girlfriend relationship can match with each other using a pair of positive and negative patterns. This can be used to map intimate man-women relationship among social relationships.

In another exemplary embodiment, when applied to social business cards used for social software, the positive-negative pair of 2D barcodes can be similar to "couple numbers" (or "couple 2D barcodes"). The two users that have the couple 2D barcodes can be a "user couple". When one of the couple 2D barcodes (i.e. a 2D barcode of one party of the user couple, and the 2D barcode can be referred to as a first 2D barcode) is scanned, the negative pattern (i.e., a virtual 2D barcode) of the 2D barcode can be chosen to be generated. The negative pattern of the 2D barcode can correspond to the other party (e.g., a second party) of the user couple, i.e., can map to the 2D barcode of the other party of the user couple. The 2D barcode of the other party of the user couple can be referred to as a second 2D barcode. Thus, after the scanning (i.e., after scanning the first 2D barcode, generating the virtual 2D barcode, and obtaining the second 2D barcode), other users can view corresponding personal information of the other party of the user couple. Thus, by knowing one person (e.g., a first party), the person's partner (e.g., a second party) can also be known at the same time. Based on the error-correction ability of 2D barcodes, images (e.g., patterns) can be customized for a matched pair of 2D barcodes. For example, interesting or symbolic patterns (such as heart-shape or a picture taken together) can be pieced into a 2D barcode (e.g., the first 2D barcode, the virtual 2D barcode, and/or the second 2D barcode).

As disclosed herein, the virtual 2D barcode can be an intermediate relationship entity that connects two pieces (or types) of information. The virtual 2D barcode can be generated electronically, i.e., not necessarily printed on a business card. Optionally, in one embodiment, the virtual 2D barcode can be shown on a 2D barcode business card. For example, if the first party of the user couple already has a first 2D barcode, an image transformation (e.g., a black-white inversion) can be performed on the first 2D barcode to generate the virtual 2D barcode. The user couple can have an option of having the virtual 2D barcode printed on the business card of the first and/or the second party of the user couple. When other users scan the virtual 2D barcode with an information obtaining apparatus, the apparatus can be properly preset to recognize that the scanned 2D barcode is a virtual 2D barcode formed by an image transformation on a first 2D barcode. Thus, the relationship information corresponding to the image transformation can be obtained. Whether a virtual 2D barcode can be shown on a business card of the first or second party, the specific methods for scanning the 2D barcodes, and the specific methods for obtaining the relationship information, can be determined based on actual applications and are not limited in the present disclosure.

For example, when the virtual 2D barcode is shown on the business card of the first party, the information obtaining apparatus can scan both the first 2D barcode and the virtual 2D barcode. The image transformation that forms the virtual 2D barcode can be identified. Because the virtual 2D barcode has a mapping relationship with a second 2D barcode, the relationship information corresponding to the image transformation can be obtained for the first 2D barcode by the information obtaining apparatus.

In another example, when the virtual 2D barcode is shown on the business card of the second party, the information obtaining apparatus can scan both the virtual 2D barcode and the second 2D barcode. By properly presetting the information obtaining apparatus, the apparatus can know beforehand that the virtual 2D barcode has a mapping relationship with the second 2D barcode. The virtual 2D barcode can be used by the apparatus to identify the first 2D barcode and the image transformation performed thereon. The relationship information corresponding to the image transformation can thus be obtained for the first 2D barcode.

The application scenarios depicted above in various embodiments are exemplary only. In practical applications, there can be other application scenarios, which are not limited in this disclosure.

Figure 3:
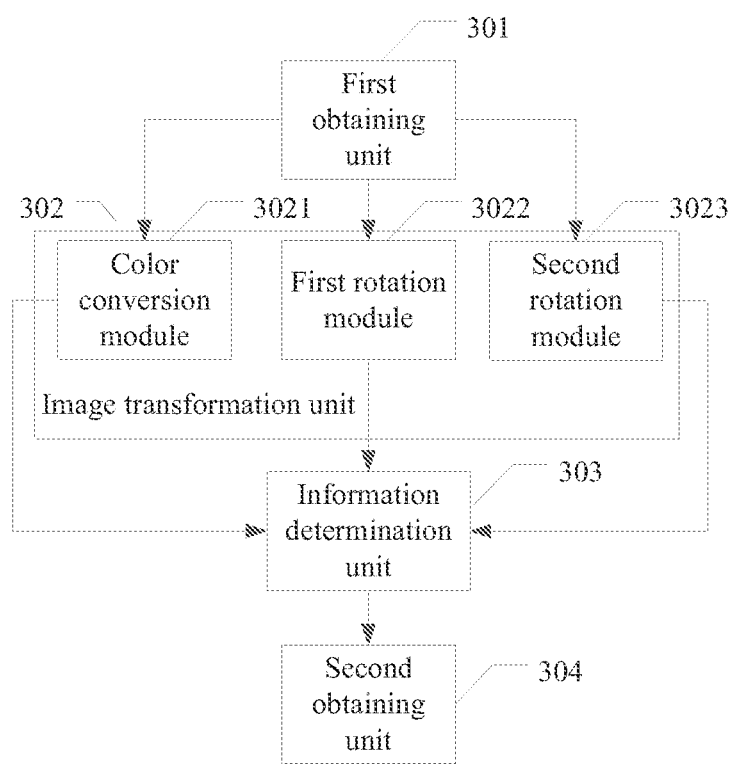
FIG. 3 depicts a logic structure diagram of an exemplary information obtaining apparatus in accordance with various disclosed embodiments.

FIG. 3 depicts a logic structure diagram of an exemplary information obtaining apparatus in accordance with various disclosed embodiments. The exemplary information obtaining apparatus can execute the information obtaining methods as disclosed above in accordance with various disclosed embodiments. As disclosed herein, the information obtaining apparatus can be used as an apparatus for information management for 2D barcode generation.

The exemplary information obtaining apparatus can include a first obtaining unit 301, an image transformation unit 302, and/or an information determination unit 303. Some units may be omitted and other units may also be included.

The first obtaining unit 301 is configured to obtain a first 2D barcode.

The image transformation unit 302 is configured to perform an image transformation on the first 2D barcode to obtain a virtual 2D barcode. Due to this function, the image transformation unit 302 can also be referred to as "2D barcode generation unit".

The information determination unit 303 is configured to obtain relationship information of the first 2D barcode according to the validity of the virtual 2D barcode. Optionally, the relationship information can include a father-son relationship, a mother-son relationship, a husband-wife relationship, a brother relationship, a sister relationship, a boyfriend-girlfriend relationship, etc.

Optionally, the image transformation unit 302 can further include a color conversion module 3021, a first rotation module 3022, and/or a second rotation module 3023. Some modules may be omitted and other modules may also be included. The image transformation of the first 2D barcode can be performed by one or more of the modules disclosed herein, so the image transformation can be a combination of more than one transformation, e.g. a color conversion followed by a rotation by an angle in a specific direction.

The color conversion module 3021 is configured to perform a black-white inversion on the colors of the image (e.g., the pattern) of the first 2D barcode.

The first rotation module 3022 is configured to rotate the image of the first 2D barcode in a clockwise direction by a preset angle.

The second rotation module 3023 is configured to rotate the image of the first 2D barcode in a counter-clockwise direction by a preset angle. The preset angle used by the second rotation module 3023 and the preset angle used by the first rotation module 3022 may or may not be the same.

In one embodiment, the information determination unit 303 can be used to determine whether the virtual 2D barcode has a mapping relationship with a second 2D barcode. If the virtual 2D barcode has a mapping relationship with the second 2D barcode, the virtual 2D barcode can thus be valid, and it can be determined that the first 2D barcode has relationship information corresponding to the image transformation. If the virtual 2D barcode has no mapping relationship with a second 2D barcode, the virtual 2D barcode can thus be invalid, and it can be determined that the first 2D barcode has no relationship information corresponding to the image transformation.

Further, optionally, the information obtaining apparatus can include a second obtaining unit 304. The second obtaining unit 304 is configured to obtain the second 2D barcode if/when the information determination unit 303 determines that the virtual 2D barcode is valid.

Operation methods of the above-described units and/or modules can be similar to or the same as the corresponding steps depicted in various disclosed embodiments, e.g., as shown in FIGS. 1-2.

As disclosed herein, the disclosed methods and apparatus can be accomplished by other means. The apparatus as depicted above in accordance with various embodiments are exemplary only. For example, the disclosed units can be divided based on logic functions. In actual implementation, other dividing methods can be used. For instance, multiple units or components can be combined or integrated into another system, or some characteristics can be omitted or not executed, etc. In addition, the coupling, direct coupling or communication connection as shown or discussed herein can be accomplished by indirect coupling or communication connection between certain interfaces, apparatus, units, etc., and can be by electrical means, mechanical means, other suitable means, or a combination thereof.

Further, units described as separate parts may or may not be physically separated. Parts shown as units may or may not be physical units. That is, a part can be located in one place, or distributed in multiple network units. Based on actual needs, some or all of the units as disclosed herein can be selected to perform the disclosed methods.

In addition, each functional unit in various disclosed embodiments can be integrated in a processing unit, or each unit can exist separately and physically, or two or more units can be integrated in one unit. The integrated units as disclosed above can be implemented in the form of hardware and/or in the form of software functional unit(s).

When the integrated units as disclosed above are implemented in the form of software functional unit(s) and sold or used as an independent product, the integrated units can be stored in a computer readable storage medium. Therefore, the whole or part of the essential technical scheme of the present disclosure can be reflected in the form of software product(s). The computer software product(s) can be stored in a storage medium, which can include a plurality of instructions to enable a computer device (such as an personal computer, a server, a network device, etc.) to execute all or part of the steps as disclosed in accordance with various embodiments of the present disclosure. The storage medium can include various media for storing programming codes including, for example, U-disk, portable hard disk, ROM, RAM, magnetic disk, optical disk, etc.

The embodiments disclosed herein are exemplary only. Other applications, advantages, alternations, modifications, or equivalents to the disclosed embodiments are obvious to those skilled in the art and are intended to be encompassed within the scope of the present disclosure.

INDUSTRIAL APPLICABILITY AND ADVANTAGEOUS EFFECTS

Without limiting the scope of any claim and/or the specification, examples of industrial applicability and certain advantageous effects of the disclosed embodiments are listed for illustrative purposes. Various alternations, modifications, or equivalents to the technical solutions of the disclosed embodiments can be obvious to those skilled in the art and can be included in this disclosure.

The disclosed methods, apparatus and electronic devices can be used in a variety of Internet applications. By using the disclosed methods, apparatus and electronic devices, a first two-dimensional (2D) barcode can be obtained. An image transformation can be performed on the first 2D barcode to obtain a virtual 2D barcode. Further, according to validity of the virtual 2D barcode, relationship information of the first 2D barcode can be obtained based on a mapping relationship of the virtual 2D barcode in a database.

In various embodiments, a 2D barcode can be applied to a 2D barcode business card. Thus, the 2D barcode business card may contain not only the information of the 2D barcode, but also the relationship information related to the 2D barcode. Thus, relationships between 2D business card users can be obtained. Therefore, the amount of information expressed by 2D barcodes can be improved in a convenient way.

What is claimed is:

1. An information obtaining method implemented by an electronic device, the method comprising:
   obtaining a first two-dimensional (2D) barcode;
   performing an image transformation on the first 2D barcode to obtain a virtual 2D barcode; and
   according to validity of the virtual 2D barcode, obtaining relationship information of the first 2D barcode, wherein the relationship information is obtained based on a mapping relationship of the virtual 2D barcode in a database,
   wherein the obtaining of the relationship information of the first 2D barcode according to the validity of the virtual 2D barcode comprises:
      determining whether the virtual 2D barcode has a mapping relationship with a second 2D barcode;
      when the virtual 2D barcode is determined to have the mapping relationship with the second 2D barcode, the virtual 2D barcode is valid and the first 2D barcode is determined to have the relationship information corresponding to the image transformation, and
      when the virtual 2D barcode is not determined to have the mapping relationship with the second 2D barcode, the virtual 2D barcode is invalid and the first 2D barcode is not determined to have the relationship information corresponding to the image transformation.

2. The method according to claim 1, wherein the performing of the image transformation on the first 2D barcode comprises one or more of:
   performing a black-white inversion on colors of an image of the first 2D barcode;
   rotating the image of the first 2D barcode in a clockwise direction by a preset angle; and
   rotating the image of the first 2D barcode in a counter-clockwise direction by a preset angle.

3. The method according to claim 1, wherein after determining whether the virtual 2D barcode has the mapping relationship with the second 2D barcode, the method further comprises:
   obtaining the second 2D barcode when the virtual 2D barcode is valid.

4. The method according to claim 1, wherein the relationship information comprises: a father-son relationship; a mother-son relationship; a husband-wife relationship; a brother relationship; a sister relationship; or a boyfriend-girlfriend relationship.

5. An information obtaining apparatus, comprising:
   a first obtaining unit configured to obtain a first 2D barcode;
   an image transformation unit configured to perform an image transformation on the first 2D barcode to obtain a virtual 2D barcode; and
   an information determination unit configured to obtain relationship information of the first 2D barcode according to validity of the virtual 2D barcode, wherein the relationship information is obtained based on a mapping relationship of the virtual 2D barcode in a database, wherein the information determination unit is further configured to determine whether the virtual 2D barcode has a mapping relationship with a second 2D barcode, wherein
when the virtual 2D barcode is determined to have the mapping relationship with the second 2D barcode, the virtual 2D barcode is valid and the first 2D barcode is determined to have the relationship information corresponding to the image transformation, and
when the virtual 2D barcode is not determined to have the mapping relationship with the second 2D barcode, the virtual 2D barcode is invalid and the first 2D barcode is not determined to have the relationship information corresponding to the image transformation.

6. The apparatus according to claim 5, wherein the image transformation unit comprises one or more of:
a color conversion module configured to perform a black-white inversion on colors of an image of the first 2D barcode;
a first rotation module configured to rotate the image of the first 2D barcode in a clockwise direction by a preset angle; and
a second rotation module configured to rotate the image of the first 2D barcode in a counter-clockwise direction by a preset angle.

7. The apparatus according to claim 5, further comprising:
a second obtaining unit configured to obtain the second 2D barcode, when the information determination unit determines that the virtual 2D barcode is valid.

8. The apparatus according to claim 5, wherein the relationship information comprises a father-son relationship; a mother-son relationship; a husband-wife relationship; a brother relationship; a sister relationship; or a boyfriend-girlfriend relationship.

9. An electronic device comprising an information obtaining apparatus, the information obtaining apparatus comprising:
a first obtaining unit configured to obtain a first 2D barcode;
an image transformation unit configured to perform an image transformation on the first 2D barcode to obtain a virtual 2D barcode; and
an information determination unit configured to obtain relationship information of the first 2D barcode according to validity of the virtual 2D barcode, wherein the relationship information is obtained based on a mapping relationship of the virtual 2D barcode in a database,
wherein the information determination unit is further configured to determine whether the virtual 2D barcode has a mapping relationship with a second 2D barcode, wherein
when the virtual 2D barcode is determined to have the mapping relationship with the second 2D barcode, the virtual 2D barcode is valid and the first 2D barcode is determined to have the relationship information corresponding to the image transformation, and
when the virtual 2D barcode is not determined to have the mapping relationship with the second 2D barcode, the virtual 2D barcode is invalid and the first 2D barcode is not determined to have the relationship information corresponding to the image transformation.

10. The electronic device according to claim 9, wherein the image transformation unit comprises one or more of:
a color conversion module configured to perform a black-white inversion on colors of an image of the first 2D barcode;
a first rotation module configured to rotate the image of the first 2D barcode in a clockwise direction by a preset angle; and
a second rotation module configured to rotate the image of the first 2D barcode in a counter-clockwise direction by a preset angle.

11. The electronic device according to claim 9, further comprising:
a second obtaining unit configured to obtain the second 2D barcode, when the information determination unit determines that the virtual 2D barcode is valid.

12. The electronic device according to claim 9, wherein the relationship information comprises a father-son relationship; a mother-son relationship; a husband-wife relationship; a brother relationship; a sister relationship; or a boyfriend-girlfriend relationship.

* * * * *